Oct. 4, 1932.  H. WEICHSEL  1,880,565
ALTERNATING CURRENT MOTOR
Filed April 26, 1930   2 Sheets-Sheet 1

Inventor
HANS WEICHSEL
By
Att'y.

Patented Oct. 4, 1932

1,880,565

UNITED STATES PATENT OFFICE

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE

ALTERNATING CURRENT MOTOR

Application filed April 26, 1930. Serial No. 447,453.

My invention relates to simplified means for changing, for speed variation purposes, the number of poles of an alternating current motor and is particularly useful in split-phase and two-phase machines. By means of my invention the stator windings of such machines can be reorganized to double the number of poles by the use of only three leads for each phase, thus obviously simplifying the switching apparatus required.

Figure 1:
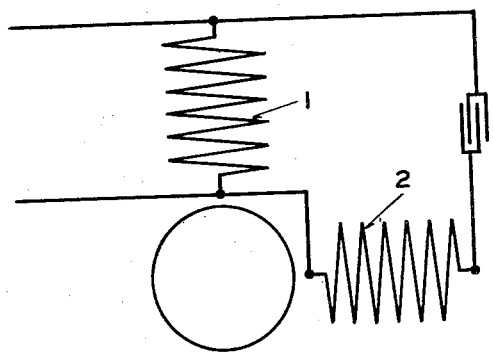
Figure 5:
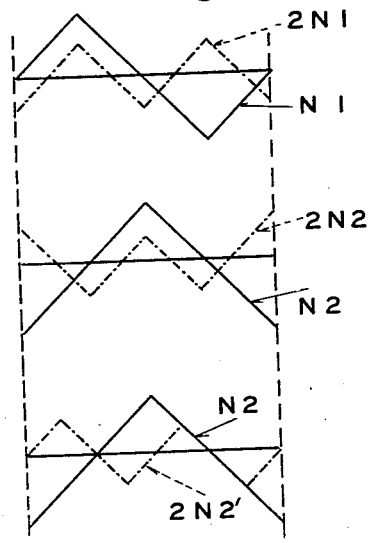

In the accompanying drawings Figure 1 diagrammatically illustrates a split-phase motor in connection with which my invention is applicable; Figures 2, 3, 4 and 6 are circuit diagrams; and Figure 5 is an explanatory diagram.

I will explain my invention in connection with a split-phase motor and will, therefore, refer to the winding 1 as the "main inducing winding" and to the winding 2 in the phase displacing circuit as the "auxiliary inducing winding."

In accordance with common prior practice the main inducing winding may be formed in an even number of groups which, when connected in parallel, will produce an N-pole magnetization, and when connected in series will produce a 2 N-pole magnetization, but if in a split-phase motor the auxiliary winding 2 is formed of groups of the same kind and relative position as the winding 1, the connecting of these groups for 2 N-pole magnetization will cause the magnetization axis of the auxiliary winding to be displaced by 45 electrical degrees from the axis under the N-pole grouping and this would result, under the 2 N-pole grouping of both the main and auxiliary inducing windings, in the poles of the auxiliary winding being coaxial with the poles of the main winding. This is diagrammatically illustrated in Figure 5 in which the line N-1 represents the field distribution produced by winding 1 under N-pole connection; 2 N-1 the field distribution produced by this winding under the 2 N-pole connection; N-2 the field distribution of winding 2 under the N-pole connection when said winding is displaced 90 electrical degrees from winding 1, as is the desired relation; and the line 2 N-2 shows the field distribution which would be produced by winding 2 if its winding groups were positioned as the winding groups of the main inducing winding 1 and connected for 2 N-pole magnetization. Thus the diagram shows that since the 2-N fields of the windings would, under the assumptions just made, be coaxial, it is not possible to make identical arrangements of the winding groups in the main and auxiliary inducing windings in split-phase motors (nor in two-phase motors) and to interconnect them in the same manner to change the machine from having N-poles to one having 2 N-poles.

It is, of course, desirable that the poles of the auxiliary winding be displaced by the same number of electrical degrees from those of the main winding in 2 N-pole operation as under N-pole operation. My invention permits this relation to be achieved without the use of any more leads to the auxiliary winding than to the main winding. It comprises providing one of the inducing windings, for example the auxiliary winding 2, with twice as many coil groups as the other winding, both windings, however, being distributed over all or substantially all of the stator periphery, and causing each group of the winding having the larger number of coil groups to overlap another group of that winding by 45 electrical degrees (measured with reference to N-pole connection). These coil groups preferably have the same number of turns, this being illustrated in Figures 4 and 6 where they are shown as each having three turns, and which figures also illustrate four winding groups constituting winding 2. The winding groups in full lines are permanently connected in series, as are also the winding groups in broken lines, and to produce 2-pole magnetization the broken line groups are connected in parallel with the full line groups. To produce 4-pole magnetization the broken line groups are connected in series to the full line groups. The lower line of arrows in Figure 4 indicate current direction under the N-pole grouping and the upper line of arrows the direction under the 2 N-pole grouping.

Figure 2:
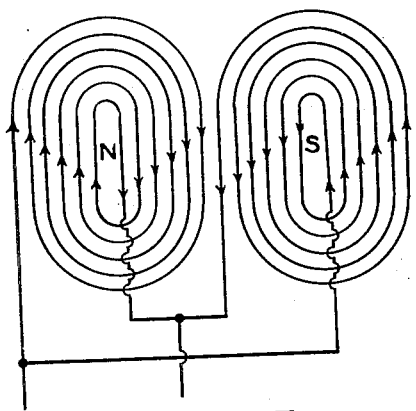
Figure 3:
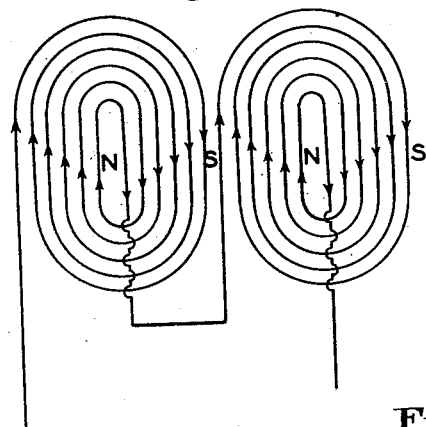

The produce 2-pole magnetization the coil groups of the main inducing winding are connected in parallel, as shown in Figure 2, and to produce 4-pole magnetization they are connected in series, as shown in Figure 3.

Figure 6:
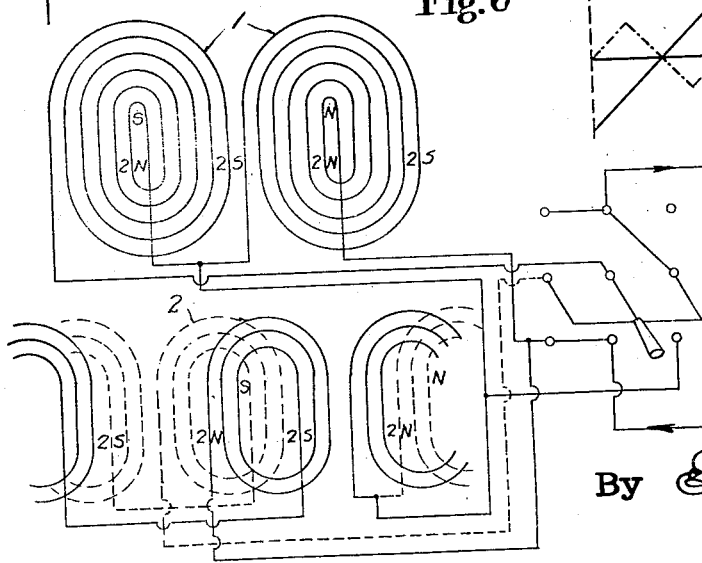

In Figure 6 the pole positions of each winding under each connection are indicated—"N" and "S", indicating the pole positions under N-pole connection and "2 N" and "2 S" the pole positions under the 2 N-pole connection.

Figure 4:
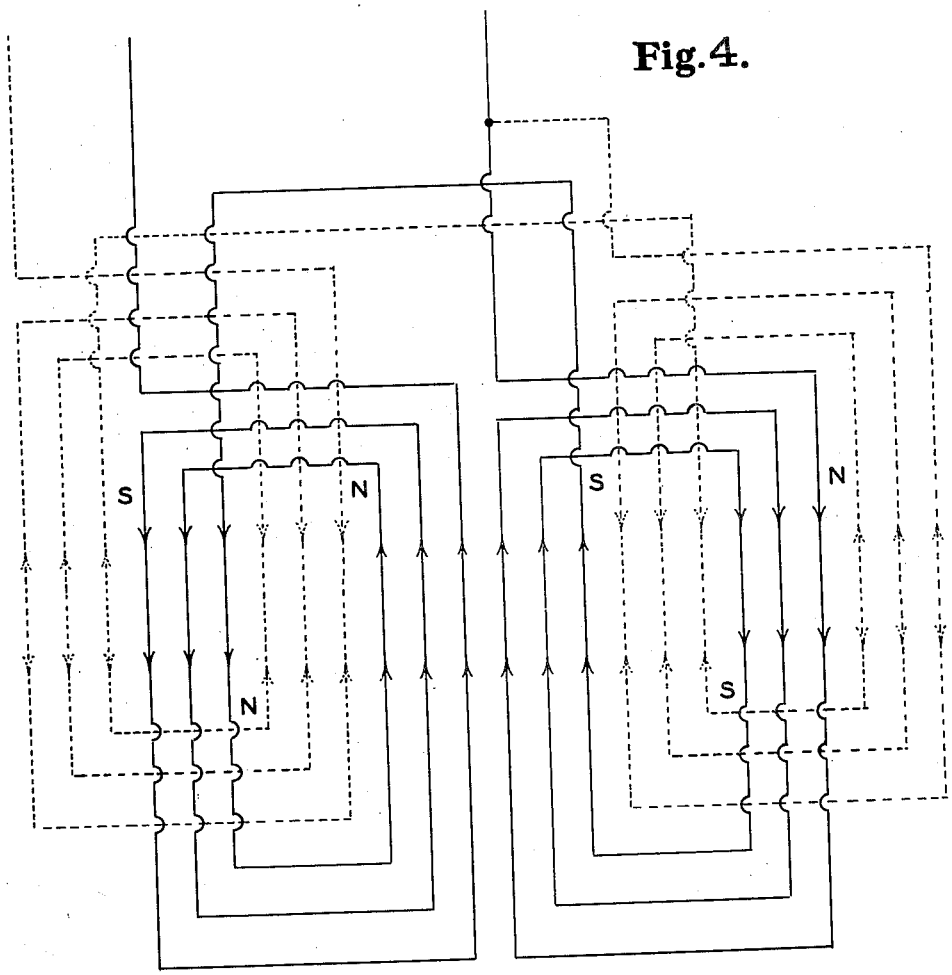

It will be noted that only three leads are necessary for grouping each of the windings for both N-pole or 2-pole magnetization. And, by the overlapping of the coil groups of the winding 2, as shown in Figure 4, the field distribution of the winding 2, under the 2 N-pole connection, becomes that indicated by broken line 2 N-2' of Figure 5 which, as shown, is in proper relation to the field distribution of the winding 1 under 2 N-pole connection, as shown by the broken line 2 N-1 of that figure.

Having fully described my invention, what I claim as new and desire to secure by Letters Patent of the United States is:

In an alternating current motor, an induced member, an inducing member provided with two distributed inducing windings for producing magnetization in two axes displaced from each other, and means for impressing on one of said windings an E. M. F. of phase differing from the E. M. F. impressed on the other winding, one of said inducing windings comprising an even number of coil groups and the other winding comprising twice said number of coil groups, each winding having its groups so positioned as to be capable, by suitable interconnection, of producing N-pole or 2 N-pole magnetization and each of the groups of the winding having the larger number of coils being positioned to overlap another group of that winding 45 electrical degrees (measured with reference to N-pole connection), whereby so interconnecting said groups of the last mentioned winding as to produce a 2 N-pole magnetization shifts the magnetization axis of the winding 45 electrical degrees (measured with reference to N-pole connection) from the position occupied under N-pole connection.

In testimony whereof, I hereunto affix my signature, this 21 day of April, 1930.

HANS WEICHSEL.